United States Patent [19]

Kollodge

[11] 4,330,705
[45] May 18, 1982

[54] OPTICAL TRACKING DEVICE USING INTERLACED IMAGES

[75] Inventor: Jerome C. Kollodge, Boulder, Colo.

[73] Assignee: Ball Corporation, Muncie, Ind.

[21] Appl. No.: 112,806

[22] Filed: Jan. 15, 1980

[51] Int. Cl.³ .............................................. G01J 1/20
[52] U.S. Cl. ............................................... 250/203 R
[58] Field of Search ............... 250/203, 349; 356/1, 356/152, 141

[56] References Cited

PUBLICATIONS

CCD Star Trackers by W. C. Goss–Jet Propulsion Lab., Pasadena, Calif.
Design, Fabrication, and Delivery of a Charge Injection Device as a Stellar Tracking Device by Burke, et al.–NASA.

Primary Examiner—David C. Nelms
Assistant Examiner—Darwin R. Hostetter
Attorney, Agent, or Firm—Nicholas T. Bokides

[57] ABSTRACT

A stellar tracking device for providing increased interpolation accuracy for locating the centroid of a stellar image on a charge transfer device (CTD) array. A beam splitter splits the beam from a star being tracked into two separate and distinct beams which are focused by a lens as separate images on the surface of the CTD array. The beam splitter and lens are configured so that the two beams are spatially phase shifted (interlaced) in each axis of the array by one half of a cycle of the transfer function of a group of pixels made up of individual CTD elements. By combining the signals derived from separate subsets of pixels associated with the two separate images, a more linear transfer function for interpolation of the centroid of the beam is achieved than can be obtained by using only a single image.

19 Claims, 4 Drawing Figures

SINGLE AXIS TRANSFER FUNCTION (I)

TYPICAL OPTICS
(TWO IMAGES)

DETECTOR 28

SINGLE AXIS
TRANSFER FUNCTION $(I_1 + I_2)$

OPTICAL TRACKING DEVICE USING INTERLACED IMAGES

BACKGROUND OF THE INVENTION

This invention relates in general to optical interlace imaging for stellar tracking and image enhancing devices. More specifically this invention relates to enhancing the performance of imaging devices by utilizing interlaced images in conjunction with charge transfer devices (CTDs) at their image planes.

During the last decade, stellar tracking and mapping devices have utilized image dissectors as the preferred star magnitude and position sensing elements. In essence, image dissectors are photomultiplier tubes having electron imaging and electron deflecting sections located between their photocathode and a sampling aperture which is at the entrance to the electron multiplier section.

Image dissectors offer various advantages in their use. They are relatively free of signal shot noise. The large comparatively noise-free gain in the multiplier section of the photomultiplier tube reduces the effect of subsequent leakage current and amplifier noise contribution to an insignificant level. The photocathodes utilized in photomultiplier tubes have thermal emmissions of only a few electrons per second or less for a typical image dissector electron aperture area. Pulse height discrimination photon counting techniques exclude the majority of electrons thermally emitted within the multiplier structure and ignore the multiplier gain distribution function. In the absence of a significant sky background or ambient radiation field, an image dissector can reliably detect a few photoelectron events per sampling period.

However, image dissectors have a number of disadvantageous characteristics which have encouraged the use of alternative devices such as the use of arrays of CTDs. These disadvantageous characteristics include the inability of image dissectors to store information. This non-storage problem heavily penalizes sensitivity to multiple targets for full frame search conditions. Other disadvantageous features of image dissector devices are their variable and unsymmetrical magnification across the field which necessitates elaborate calibration for precise offset pointing, and their fatigue and damage susceptibility of photocathodes. In addition, image dissectors have a relatively large weight and power demand, require high voltages, are fragile, and are subject to influence by magnetic fields. Furthermore, they are quite expensive.

As an alternative to the use of image dissectors, silicon photo-diodes or photo-voltaic detectors have been utilized for some application because of their low cost, small size, rugged construction, stability, insensitivity to magnetic fields, and their ability to operate at voltage levels that are compatible with micro circuits. Stellar tracker devices have been built utilizing silicon detectors despite their relatively limited field of view, relatively poor sensitivity, and inability to electronically gimbal or provide accurate star position information except in a very limited region about a null point.

A superior alternative to the image dissector and silicon detector utilizes an array of CTDs which offer the advantages of the silicon detector while suffering few of its disadvantages and further providing capability not available with either the image dissector or silicon sensor.

A detailed discussion of specific performance characteristics CTDs vis-a-vis image dissectors including a comparison of signal and characteristics can be found in a paper by W. C. Goss, Jet Propulsion Laboratory, Pasadena, California, entitled CCD STAR TRACKERS presenting the results of research carried out at the Jet Propulsion Laboratory, California Institute of Technology, under Contract No. NAS 7-100 sponsored by the National Aeronautics and Space Administration. This paper was published in the Proceedings of the Symposium on Charge Coupled Device Technology for Scientific Imaging Application given Mar. 6–7, 1975.

CTD-type trackers include a CTD array to provide a minute area for each individual pixel element along with charge storage capability and broad-band high quantum efficiency response for producing a high level of sensitivity. However, there are several problems inherent in the use of CTDs for stellar tracking devices that are not encountered utilizing image dissectors. A signal processing complexity arises because of the discrete nature of the detector array structure. A stellar image will not generally fall upon a single element or pixel at a time. It is necessary to locate the centroid of an image by utilizing the signals generating from a plurality of elements onto which some illumination from the image falls. Interpolation techniques are utilized to locate the centroid of an extended star image to within a fraction of an individual pixel. Such processing techniques require substantial memory capacity and logic capability since signals from a plurality of elements must be processed several ways to derive star magnitude and interpolated image centroid position.

Utilizing conventional CTD array star tracker configurations, a transfer function is typically developed for a subset of four pixels for an image moving across those pixels. Unfortunately, this transfer function is highly non-linear particularly at its extremes, causing certain inaccuracy in the interpolation.

Referring now to FIG. 1 there is shown a conventional stellar tracker configuration. A light beam represented by arrows 10 is focused by a lens 12 onto the surface 14 of an array of light sensitive elements 16. For ease of illustration, a portion of array 16 is shown as including individual elements 16-1 . . . 16-35. These individual light sensitive elements are suitably photo sites of a charge transfer device (CTD) each capable of generating an electrical signal related to the amount of light impinging thereon. Each numbered square represents a single pixel of the total optical field defined by array 16.

Typically, a light beam focused on surface 14 of array 16 will impinge upon more than one pixel at a time. Therefore, without examining the signals from a plurality of pixels, it cannot be determined precisely where the focus and hence the light emitting object, is located. As shown in FIG. 1, the image formed by the beam is shown as including light falling on twelve separate and distinct pixels (16-10, 16-11, 16-16, 16-17, 16-18, 16-19, 16-23, 16-24, 16-25, 16-26, 16-31, and 16-32). As the image moves across the array, corresponding to the motion of the light emitting object to be tracked, a transfer function is developed between pixels by solving for the centroid using the signals from a subset of pixels containing the image. For example, if the subset of pixels of interest includes pixels 16-17, 16-18, 16-24, and 16-25, each of these pixels generates a signal related to the amount of light impinging thereon. If the signals from pixels 16-18 and 16-25 are added to one another to form a "right" signal and the signals from pixels 16-17 and 16-24 are added to one another to form a "left" signal and the "left" signal is subtracted from the "right" signal, a transfer function is formed for the motion of the image shown in the figure as it moves from left to right across the four pixels in the subset.

Referring now to FIG. 2, there is shown a graphical plot of the transfer function of an arbitrary subset of four pixels such as 16-17, 16-18, 16-24, and 16-25. The ordinate of this graph represents the position of the image with respect to the subset of pixels and the abscissa represents the output signal level resulting from the subtraction of the "left" signal from the "right" signal. FIG. 2 includes two separate plots of transfer functions, a first transfer function Is representing a "small" image (with respect to pixel size) and a second transfer function I1 representing a "large" image (with respect to pixel size). For the case where the image is positioned as shown in FIG. 1, equal amounts of light fall on pixels 16-17, 16-18, 16-24, and 16-25. Thus, when the left signal is subtracted from the right signal, the result is zero. This corresponds to the point on the graph where both the small image transfer function and large image transfer function cross the ordinant. As the image moves to the right, more light will fall on pixels 16-18 and 16-25 than will fall on pixels 16-17 and 16-24. Thus, the signal resulting from the subtraction of the left signal from the right signal will become more positive as illustrated by both transfer function plots in the region to the right of the zero crossing. As the image moves to the left, more light will fall on pixels 16-17 and 16-24 than falls on pixels 16-18 and 16-25. Thus, the net signal resulting from the subtraction of the left signal from the right signal will yield a more negative result as shown by the plots of the small and large image transfer functions to the left of the zero crossing. The transfer function thus plotted is used to interpolate position between pixels and is repetitive at pixel intervals. The transfer functions plotted are typical for large and small images relative to pixel size for each pixel cycle. Both the linearity and average slope of these transfer functions are highly dependent on image diameter and the energy profile of the image. Uncertainty in these parameters results in tracking error. Furthermore, a relatively large image is required to insure a reasonable slope over the entire pixel cycle. This results in a relatively low average slope as shown in FIG. 2 for a large image. If a smaller image is used to improve the average slope, the slope near the extremes of each cycle approaches zero, rendering interpolation highly inaccurate.

A rather detailed explanation of the application of the standard interpolation technique is set forth in a Final Technical Report published by the National Aeronautics and Space Administration in April 1979 under Contract NA58-32801, SRD-78-171, entitled DESIGN, FABRICATION, AND DELIVERY OF A CHARGE INJECTION DEVICE AS A STELLAR TRACKING DEVICE by H. K. Burke et al.

SUMMARY OF THE INVENTION

It is therefore the primary object of the present invention to provide a stellar tracker configuration providing increased interpolation accuracy for locating of the centroid of a stellar image on a CTD array.

The stellar tracker configuration provided by the present invention includes a beam splitter for splitting the beam from a star being tracked into two separate and distinct beams. These two separate and distinct beams are focused by a lens as separate images on the surface of a CTD array. The beam splitter and lens are configured so that the two beams are spacially phase shifted (interlaced) in each axis of the array by one half of a cycle of the transfer function shown in FIG. 2. By combining the signals derived from the separate subsets of pixels associated with the two separate beams, a more linear transfer function for interpolation of the centroid of the beam is achieved, than is possible using only a single image.

BRIEF DESCRIPTION OF THE DRAWINGS

Many of the attendant advantages of the present invention will be readily apparent as the invention becomes better understood by reference to the following detailed description with the appended claims, when considered in conjunction with the accompanying drawings, wherein:

DETAILED DESCRIPTION OF THE PREFERRED EMBODIMENT

Figure 3:
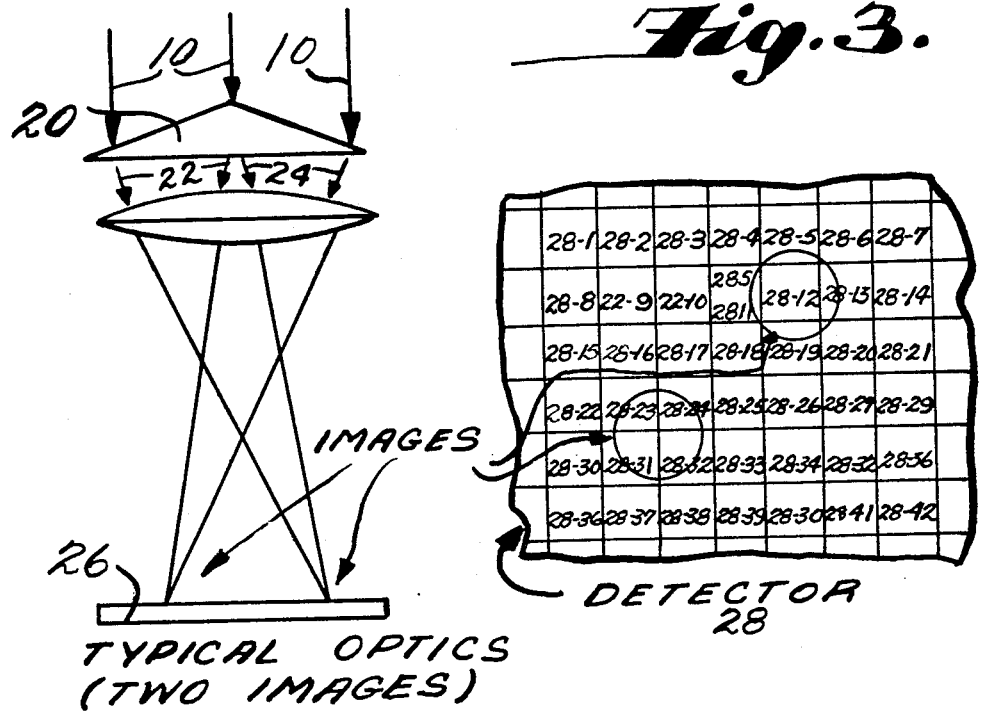
FIG. 3 is a pictorial representation of a star tracker configuration according to the present invention.

Referring now to FIG. 3, there is shown a pictorial and diagramatic representation of an improved star tracker configuration according to the present invention. A beam of light from a star to be tracked is indicated by arrows 10. This incident beam 10 is split into two separate and distinct beams by a beam splitter 20, suitably a prism window. These two separate and distinct beams are indicated by arrows 22 and 24. The two separate beams are focused by lens 12 as two separate images on the surface 26 of a CTD array 28. For convenience, the individual elements or pixels of a section of array 28 are numbered 28-1 . . . 28-42. As shown, the two separate and distinct beams formed by beam splitter 20 produce two separate and distinct images. One of these images partially illuminates pixels 28-23, 28-24, 28-30, and 28-31 and the other image substantially irradiates pixel 28-12 while partially irradiating pixels 28-5, 28-13, 28-11, and 28-19. Pixels 28-23, 28-24, 28-30, and 28-31 comprise a first subset of pixels and pixels 28-5, 28-6, 28-12, and 28-13 comprise a second subset of pixels.

Figure 1:
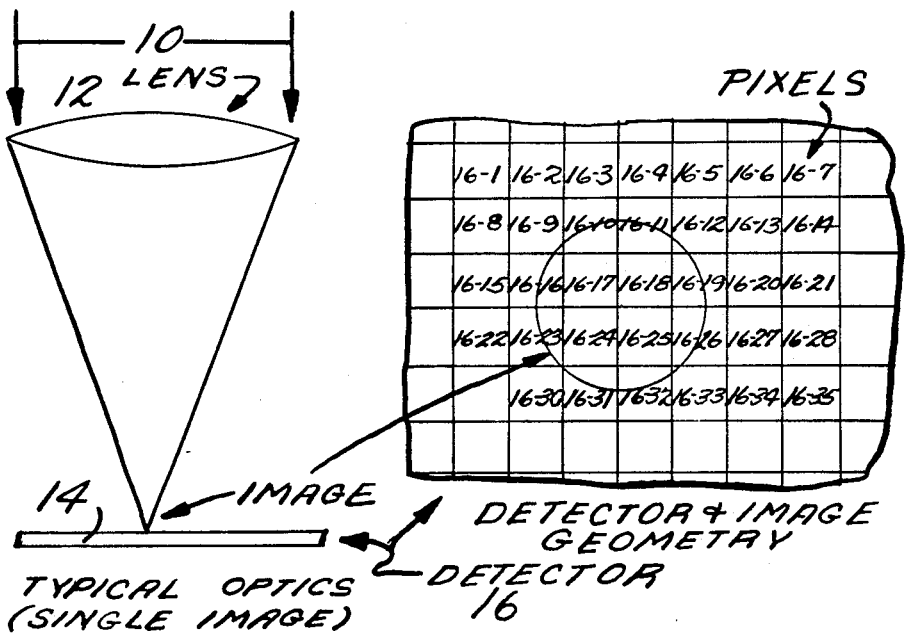
FIG. 1 is a pictorial representation of a conventional stellar tracker configuration.
Figure 2:
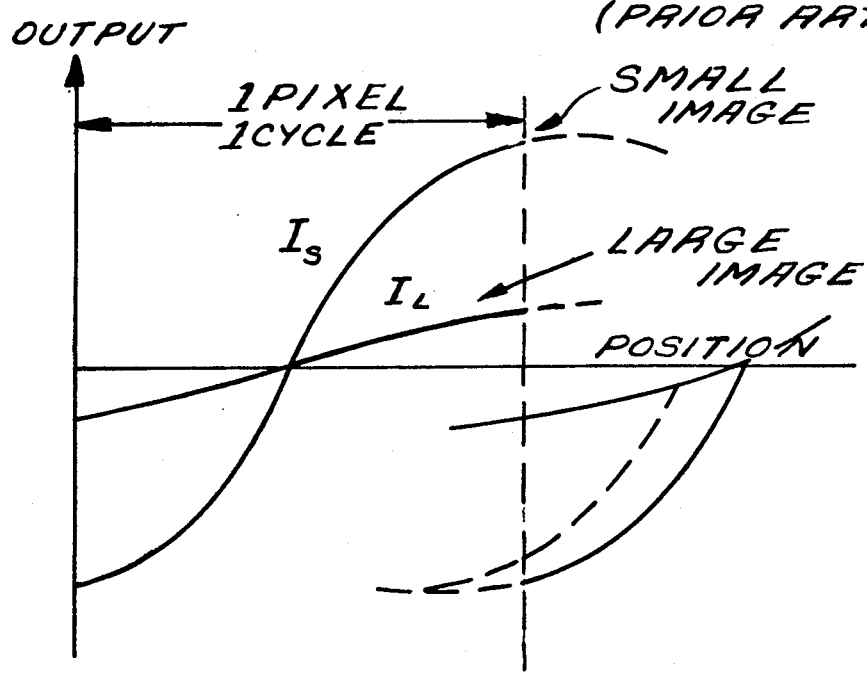
FIG. 2 is a graphical representation of the transfer function of an arbitrary subset of four pixels of the conventional stellar tracker configuration shown in FIG. 1.

Each of these subsets of pixels exhibits a transfer function as shown in FIG. 2 for images traversing them from left to right. This transfer function is the resultant signal formed by subtracting the summed signals of the two left pixels of a subset of four from the two right pixels of the same subset.

Beam splitter 20 and lens 12 are configured so as to produce two images on the surface 26 of detector 28 that are spacially phase shifted in each axis by a half cycle, thereby causing the images to be optically interlaced.

As the pair of images moves across the surface 26 of array 28, the transfer function is developed by independently solving for the centroid of each image, then algebraically summing the two. The resulting transfer function is illustrated in FIG. 4.

Figure 4:
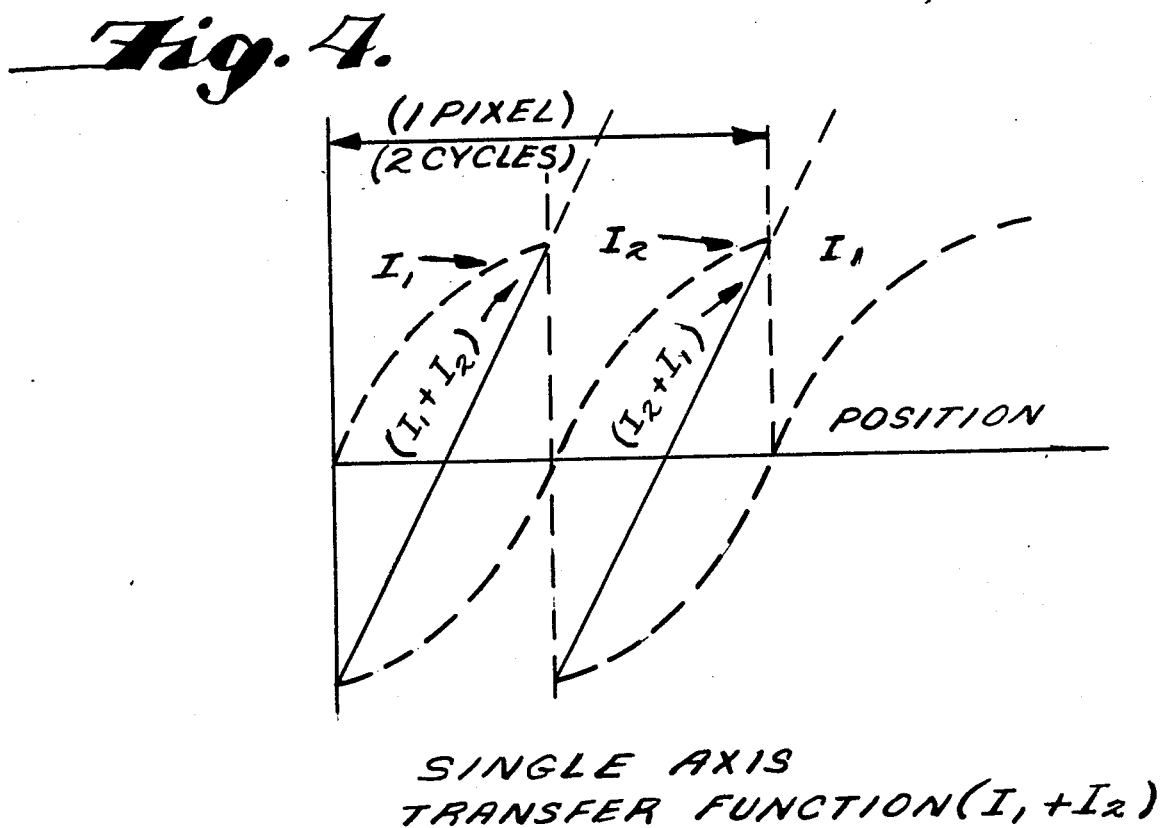
FIG. 4 is a graphical representation of the transfer function resulting from the summation of the individual transfer functions developed for two optically interlaced subsets of pixels as shown in FIG. 3 and according to the present invention.

Referring now to FIG. 4 there is shown a graphical representation of the transfer function resulting from the summation of the individual transfer functions developed for two optically interlaced subsets of pixels. The transfer functions labeled $I_1$ and $I_2$ shown by dotted lines represent the transfer functions for two separate subsets of pixels, each separate function closely approximating the function for a small image depicted in FIG. 2. The solid line indicates the algebraic summation of two such transfer functions that are spacially phase shifted by one half of a pixel cycle. This summation, labeled $I_1 + I_2$ is a highly linear transfer function. In the example shown in FIGS. 3 and 4, very small images are utilized for maximum average slope. Even though the two individual transfer functions are non-linear, the sum of the two is extremely linear. The same holds true for a broad range of image diameters. This linearity remains for a significant overlap of adjacent cycles so that a measurement of image position at the overlap position is used to determine average slope at each transition. This measurement can then be used as a correction factor in an interpolation algorithm utilized to determine the position of the star being tracked thereby minimizing tracking error.

The use of a beam splitter 20 causing two separate and distinct images to appear on the surface of a CTD array results in an approximate 6:1 advantage in signal to noise ratio, and a 4:1 advantage in accuracy of locating the star's position.

In addition to providing a higher degree of accuracy of locating stars being tracked, the use of a dual image can be applied to the enhancement of low contrast images. It has been difficult for low contrast extended targets to discriminate spatial variations in detector response and noise from target characteristics. Edge enhancement is commonly used to minimize the effects of large area (low frequency) blemishes. This edge enhancement is typically accomplished by holding an image in memory, by shifting that same image horizontally and vertically one pixel, and then subtracting one image from the other pixel by pixel. Thus, the first derivative of the contrast over an entire frame is obtained. This process is sometimes repeated to obtain multiple derivatives. However, errors resulting from anomalies in adjacent pixels remain in the results because they are included in the first derivative. By utilizing the split beam optical interlace approach, the degrading effects of such anomalies are totally eliminated in detectors processing extended images. This is accomplished by adding a chopper, either a mechanical or electro optical chopper, to the optical configuration shown in FIG. 3. Each of the interlace images is alternately exposed independently of the other. The two image signals are then stored and subtracted from each other on a pixel by pixel basis so that the first derivative of the contrast over an entire frame is obtained. Since each subtraction now involves two signals from a single pixel rather than signals from adjacent pixels, all common modes signals are rejected. The optically chopped interlaced system therefore eliminates the effect of spatial anomalies in the detector allowing detection to a much lower contrast level then would otherwise be possible.

Analysis by the applicant indicates that there is a distinct operational advantage in utilizing a CTD interlaced vis-a-vis a non-interlaced optical imaging system. By utilizing the interlaced optical imaging systems, error and accuracy parameters are enchanced over those representative non-interlaced CTD imaging systems.

Therefore, it is apparent that there has been provided a new configuration for a stellar tracker offering enhanced accuracy and resolution over conventional configurations.

Other embodiments and modification of the present invention will be apparent to those of ordinary skill in the art having the benefit of the teaching presented in the foregoing description and drawings. It is therefore, to be understood that this invention is not to be unduly limited and such modifications are intended to be included within the scope of the appended claims.

What is claimed and desired to be secured by letters patent of the United States is:

1. A method for defining the position of a light-emitting object comprising the steps of:
    splitting the beam of light from the light emitting object to form at least two beams of light;
    focusing the two beams of light onto an array of light sensitive elements each light sensitive element generating an electrical signal related the amount of light focused thereon;
    generating a first beam signal from a first subset of the light sensitive elements;
    generating a second beam signal from a second subset of the light sensitive elements; and
    combining the first and second beam signals to form a composite signal representing the position of the light-emitting object.

2. A method for defining the position of a light-emitting object comprising the steps of:
    splitting the beam of light from the light emitting object to form at least first and second beams of light;
    focusing said first beam of light onto a first subset of elements of an array of light sensitive elements, each light sensitive element generating an electrical signal related to the amount of light focused thereon;
    focusing said second beam of light onto a second subset of elements of an array of light sensitive elements, each light sensitive element generating an electrical signal related to the amount of light focused thereon;
    generating a first beam signal from said first subset of the light sensitive elements by subtracting a signal developed from at least one element of said first subset from a signal from at least one other element of said second subset;
    generating a second beam signal from said second subset of the light sensitive elements by subtracting a signal developed from at least one element of said second subset from a signal developed from at least one other element of said second subset; and
    combining the first and second beam signals to form a composite signal representing the position of the light-emitting object.

3. A method for defining the position of a light-emitting object comprising the steps of:

providing an array of discrete light sensitive elements, each such element for generating an electrical signal related to the amount of light impinging thereon;

splitting the beam of light from the light emitting object to form at least two beams of light impinging on the array in an optically interlaced manner;

generating a first beam signal from a first subset of the light sensitive elements;

generating a second beam signal from a second subset of the light sensitive elements; and combining the first and second beam signals to form a composite signal representing the position of the light-emitting object.

4. Apparatus for defining the position of a light-emitting object comprising:

an array of light sensitive elements;

means for splitting the beam of light from the light emitting object to form at least two beams of light;

means for focusing the two beams of light onto said array of light sensitive elements, each light sensitive element generating an electrical signal related to the amount of light focused thereon;

means for generating a first beam signal from a first subset of the light sensitive elements;

means for generating a second beam signal from a second subset of the light sensitive elements; and means for combining the first and second beam signals to form a composite signal representing the position of the light-emitting object.

5. An apparatus according to claim 4 wherein said light sensitive elements are charge-transfer devices (CTDs).

6. An apparatus according to claim 5 wherein said CTDs are charge-coupled devices (CCDs) or charge injection devices (CIDs).

7. An apparatus according to claim 5 wherein said CTDs are charge injection devices (CIDs).

8. An apparatus according to either of claims 4 or 5 wherein said means for generating a first beam signal comprises:

means for generating a third signal from a first element within said first subset;

means for generating a fourth signal from a second element within said first subset; and means for combining said third and fourth signals to form said first beam signal.

9. An apparatus according to either of claims 4 or 5 wherein said means for generating a second beam signal comprises:

means for generating a fifth signal from a first element within said second subset;

means for generating a sixth signal from a second element within said second subset; and means for combining said fifth and sixth signals to form said second beam signal.

10. Apparatus for defining the position of a light-emitting object comprising:

an array of discrete light sensitive elements;

means for providing optically interlaced beams of light from the light emitting object irradiating said array;

means for generating first and second beam signals from first and second subsets of the light sensitive elements of said array, the optically interlaced beams falling on each of said first and second subsets of elements;

means for combining the first and second beam signals to form a composite signal representing the position of the light-emitting object.

11. An apparatus according to claim 10 wherein said means for providing optically interlaced beams includes a beam splitter.

12. An apparatus according to either of claims 10 or 11 wherein said array of light sensitive elements is an array of charge transfer devices.

13. In an optical tracking system for determining the position of a light-emitting object, the system of the type including an array of light sensitive elements each producing a signal related to the amount of light impinging thereon and means for focusing a light beam from the light emitting object whose position is to be determined and means for interpreting the signals generated by the light sensitive elements, the improvement comprising:

means for splitting the beam of light from the light-emitting object into first and second beams;

means for focusing the first and second beams onto separate and distinct first and second subsets of elements of the array of light sensitive elements;

means for generating first and second beam signals; and means for combining the first and second beam signals to form a composite signal indicative of the position of the light-emitting object.

14. The improvement according to claim 13 wherein said means for generating a first beam signal comprises:

means for generating a third signal from a first element within said second subset;

means for generating a fourth signal from a second element within said second subset; and means for combining said third and fourth signals to form said first beam signal.

15. The improvement according to claim 13 wherein said means for generating a second beam signal comprises:

means for generating a fifth signal from a first element within said second subset;

means for generating a sixth signal from a second element within said second subset; and means for combining said fifth and sixth signals to form said second beam signal.

16. In an optical tracking system for determining the position of a light-emitting object, the system of the type including an array of light sensitive elements each producing a signal related to the amount of light impinging thereon and means for focusing a light beam from the light emitting object whose position is to be determined and means for interpreting the signals generated by the light sensitive elements, the improvement comprising:

means for providing a pair of optically interlaced images of said light-emitting object impinging upon the array of light sensitive elements;

means for generating separate signals related to the optically interlaced images; and means for combining the separate signals to generate a position signal related to the position of the light-emitting object.

17. In a stellar tracker system of the type including an array of charge transfer devices (CTDs), each providing a signal related to the amount of light impinging thereon and including means for focusing a light beam from a star to be tracked and means for interpreting the signals generated by these CTDs, the improvement comprising:

means for splitting the beam of light from a star to be tracked into first and second beams;

means for focusing the first and second beams onto separate and distinct first and second subsets of CTD elements of the array so as to generate first and second beam signals; and means for combining the first and second beam signals to form a composite signal indicative of the position of the star to be tracked.

18. In an optical tracking system for determining the position of a light emitting object of the type including an aray of light sensitive elements, each producing a signal related to the amount of light impinging thereon and means for focusing a light beam from the light emitting object whose position is to be determined and means for interpreting the signals generated by the light sensitive elements, and an improved method comprising steps of:

splitting the beam of light from the light emitting object to form at least two separate distinct beams of light;

focusing the two beams of light onto the array of light sensitive elements, each light sensitive element generating an electrical signal relating to the amount of light focused thereon;

generating a first beam signal from a first subset of the light sensitive elements;

generating a second beam signal from a second subset of the light sensitive elements; and summing the first and second beam signals to form a composite signal representing the position of the light emitting object.

19. In a stellar tracker system for determining the position of a star of the type including an array of charge coupled devices each producing a signal related to the amount of light impinging thereon and means for focusing a light beam from the star being tracked whose position is to be determined and means for interrupting the signals generated from the charge transfer devices, and improved method for processing image signal comprising the steps of:

splitting the beam of light from a star into first and second beams;

chopping the resulting beams in a time dependent fashion to form at least two image signals;

exposing the image signals on the array of charge transfer devices to produce an electrical signal corresponding thereto;

storing each of the image signals; and subtracting the image signals from one another on a pixel by pixel basis.

* * * * *